3,449,051
DIFFERENTIAL OPTICAL SYSTEM AND OPTICAL ELEMENTS THEREFOR
Ralph S. Levitt, Ossining, N.Y., assignor, by mesne assignments, to U.S. Philips Corporation, New York, N.Y., a corporation of Delaware
Filed Dec. 27, 1965, Ser. No. 516,369
Int. Cl. G01h 21/46
U.S. Cl. 356—130                                 12 Claims

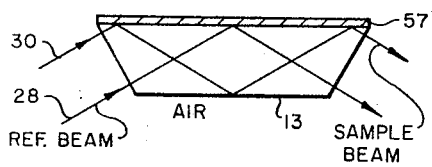
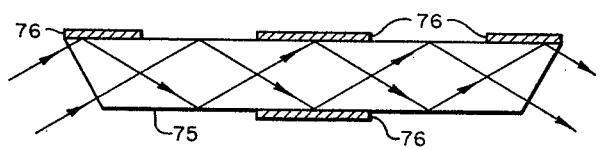
Fig. 6
Fig. 7
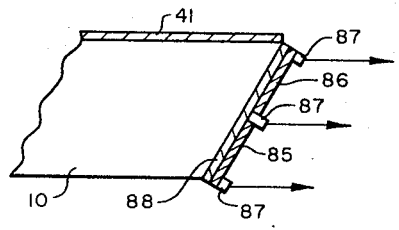
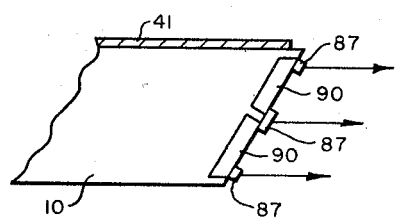
Fig. 8
Fig. 9
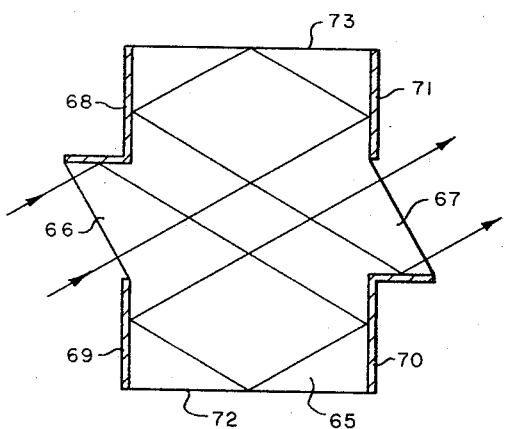
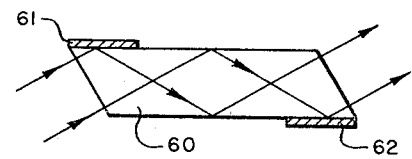
Fig. 5
Fig. 4
INVENTOR.
R. S. LEVITT
BY
AGENT United States Patent Office 3,449,051
Patented June 10, 1969

ABSTRACT OF THE DISCLOSURE

A differential optical system comprising a common prism having plane parallel surfaces each in contact with a different external environment. Two beams of radiation are transmitted through the prism in such manner that one beam reflects off the interface of one parallel surface with the environment and the other beam reflects off the interface of the other parallel surface with the environment, and the two beams are then detected by a differential detection system to measure the difference in the signal levels representative of the beam intensities. The geometry is arranged so that the angle of incidence of the beams on the interfaces is just below the critical angle. For a refractometer, the change in the refractive index of one environment will produce a change in the output signal level. As a light beam tracker, if the source of the beams moves changing the angle of incidence, an output signal can be used to measure that change. A novel beam splitter is also described for providing two parallel spaced beams from a single source.

---

This invention relates to a differential optical system and optical elements therefor. Such systems and elements are capable of use in many different applications, for example, as a refractometer or as a light beam tracker or angle sensor.

Differential techniques have been widely used heretofore in optical systems where small changes in beam intensity must be accurately measured. The basic principle is to compare the sample beam whose intensity varies with a so-called standard beam, and thus to measure the difference in the intensities of the two beams rather than the absolute change in intensity of the sample beam itself. The advantages offered are, first, that the measurement involving differences of intensities of two beams is inherently more sensitive, and, second, that efforts can be exerted to minimize fluctuations in the sample beam intensity which are unrelated to the phenomenon under study. Despite marked improvements in recent years in this field, there still exists a need for such optical systems with enhanced sensitivity. Especially is there a need for a compact system, of relatively low cost, which would thus increase the possible uses to which this sensitive instrument can be put.

A paper entitled "Recording Refractometer," published in "Analytical Chemistry," 21, 1470 (1949), describes a compact two prism, differential refractometer for liquid analysis, which is of high sensitivity but of relatively complex form and thus of high cost. Moreover, it is necessary to pipe a sample of the unknown liquid past the prism during operation, and thus this refractometer does not lend itself to direct in-line measurements of flowing liquids or for direct immersion into the unknown liquid.

One object of the present invention is an improved differential optical system of small size and compact form.

Another object of the present invention is a differential optical system of high sensitivity.

Still a further object of the invention is a differential optical system which is adapted for direct immersion and in-line analysis of liquid samples.

Still another object of the invention is new optical elements useful in a differential optical system and also capable of independent application in other optical devices.

A further object of the invention is an improved refractometer.

Another object of the invention is an improved light beam direction detector.

The realization of these and other objects of the invention will become more apparent from the following detailed description of several exemplary embodiments of my invention taken in conjunction with the accompanying drawings wherein:

FIGS. 4, 5, 6 and 7 are side views of a modification of the prism of the embodiment of FIG. 1.

FIGS. 8 and 9 show further modifications.

While the optical system and elements of the invention have wide application, they will be described in detail in connection with their use as a refractometer and as a sensitive light beam direction detector, as these are areas which, at the present time, have a pressing need for more sensitive and more compact devices.

Figure 1:
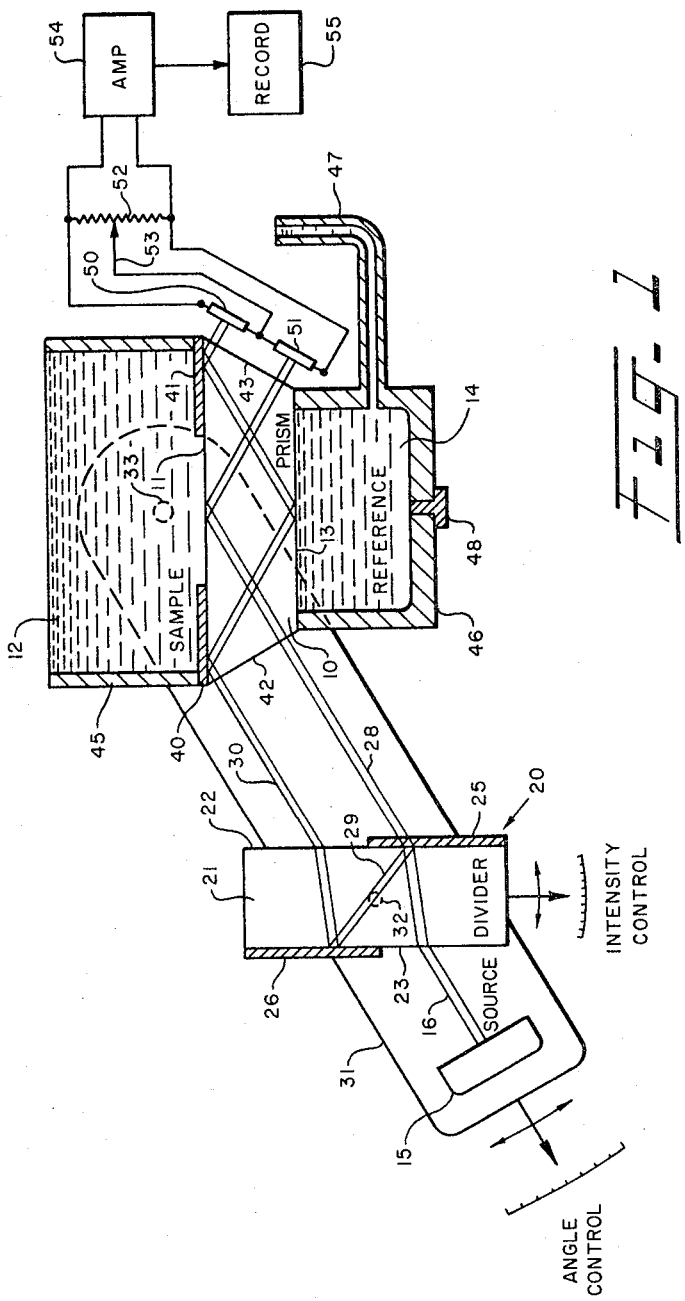
FIG. 1 is a schematic view of one form of optical system in accordance with my invention.

FIG. 1 shows schematically one form of my new optical system being used as a refractometer. As is known, the principle of the refractometer is to obtain knowledge concerning the characteristics of an unknown sample by measuring its refractive index. This is done, in a simple, widely used device by placing the sample in contact with a major surface of a prism, and then sighting through another surface of the prism with a telescope at the illumination of the interface of the sample and the prism, and adjusting the sighting angle until the illumination disappears. This means that the critical angle has been passed, and the light entering through a third surface of the prism no longer totally reflects from the prism surface containing the sample. The critical angle ($\theta_c$) is a function of the ratio of the refractive indices of the sample and the prism. With a prism of known composition, with a known index, measurement of the critical angle enables one to calculate the refractive index of the unknown sample. While small compact devices of this kind are in use, they are of limited sensitivity because it is a subjective technique and because of the need for providing a goniometer for measuring the critical angle. In my novel optical system used as a refractometer, I obtain enhanced sensitivity by operating at an angle of incidence which is just below the critical angle. At just below the critical angle, the change in reflectivity of the incident beam at the interface is extremely large and extraordinarily sensitive to very small changes in the reflective index. To further enhance the sensitivity, I simultaneously pass a second beam through a different portion of the same prism to impinge on a different surface in contact with a known substance, and then I provide a differential measuring circuit comparing the difference in intensities of the two beams. One of the features of my invention is the use of a common prism on which is provided both the unknown sample and the reference, each being irradiated by only one of two parallel beams following essentially identical paths and originating from a common source. With the geometry indicated, the exiting beams also follows essentially identical paths to a matching detector arrangement. By this means, I reduce to a minimum any fluctuations in the beam intensities which are unrelated to change in the refractive index of the sample, such as inhomogeneities in the prism or in the beam paths or even in the differential electrical circuit. Moreover, effects due to temperature changes in the sample can also be reduced.

In the form shown in FIG. 1, in which various elements have been enlarged and exaggerated for the sake of clarity, the common prism is designated 10 and is in the form of a trapezoid, and on one major surface 11 is provided a sample 12 of the unknown material to be analyzed, and on the opposite major surface 13 of which is provided the standard substance 14. For best results, it is preferred that the refractive index of the standard 14 be as close as possible to that of the unknown sample 12, as higher sensitivity is thus obtained. Where such extreme sensitivity is not required, the standard can be air. The two major surfaces 11 and 13 in this preferred embodiment are flat and parallel. The radiation is provided from a source 15 which preferably produces a collimated, monochromatic, polarized beam of radiation 16. The wavelength used is most often in the infrared region, though it can also, depending upon the materials being analyzed, extend into the visible or ultraviolet range. While the infrared glower or incandescent lamp provided with appropriate filter monochromators, collimator and polarizers can be employed, it is preferred to employ a laser whose output window is at Brewster's angle. The laser thus directly generates a collimated, monochromatic, polarized beam. For the sake of compactness, a semiconductor injection laser or light-emitting diode can be employed.

The single beam 16 originating from the source is divided into two spaced beams by a novel beam splitter designated 20. While it is possible to physically divide the beam into two halves by an intervening barrier, since the different halves of the beams may be unequal, deriving from different portions of, say, a hot filament or a laser device, I prefer to employ my novel beam splitter which takes a single beam and splits it into two separated components, each of which are substantially identical to one another and are part of the original generation. A further feature of my novel beam splitter is that the relative intensities of the two halves can be varied by changing the orientation of the splitter without affecting the resultant directions or in this case parallelism of the split beams. The geometry of the device itself determines the spacing between the beams.

In the form shown, my novel beam splitter comprises a single body 21 in the form of a flat plate of optically transparent material whose opposite major surfaces 22, 23 have been ground and polished flat and parallel. On the rear surface 22 in a position to intercept the incident beam is provided a thin single or multiple layer or coating of a partially reflecting and transmitting film 25. On the front face is provided a thin layer or coating of material 26 which is opaque and highly reflecting. As will be noted, when viewed normally, the two films 25, 26 overlap one another. The uncoated portions of the front surface 23 can be provided if desired with an antireflecting coating.

The incident beam 16 upon striking the free surface 23 of the plate 21 is refracted inward to impinge upon the interface of it with the remote film 25. A certain fraction of the incident beam will be transmitted 28 and the remainder of the beam reflected back 29 into the body toward the reflecting film 26. The beam 30 reflecting from the latter strikes the clear portion of the remote surface 22 and emerges as a beam 30 parallel and coplanar with the beam 28 and the incident beam 16. Thus, the two emerging beams 28 and 30 are parallel with a spacing determined by the optical thickness of the plate 21, and with relative intensities dependent upon the reflectivity and transmissivity of the coatings 25 and 26. Changes in the relative intensities can be obtained by changing the angle of inclination of the plate or body 21 relative to the incident beam, without any substantial change in the beam directions. For this purpose, the divider 20 is mounted on an underlying arm 31 by means of a pivot 32 enabling the divider 20 to be rotated in the plane of the drawing relative to the incident beam 16. The arm 31, which also supports the source 15, is rotatable or pivotable about a pivot point 33. This allows both the source 15 and divider 20 to rotate relative to the prism 10 in order to adjust the angle of incidence of the beams 30 and 28 to just below the critical angle of the prism-sample interface.

Figure 2:
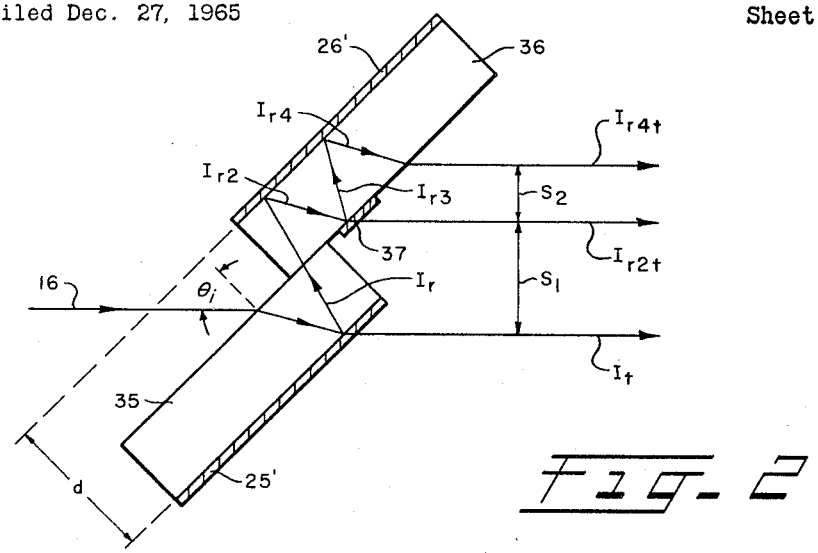
FIG. 2 is a side view of a modification of the beam divider of the embodiment of FIG. 1, illustrating its principles of operation.

For a more complete description of the principles of operation of my novel beam splitter and to illustrate other constructions which will produce similar results, reference is now made to FIG. 2. As will be recalled from the embodiment of FIG. 1, the basic geometry of the beam divider 20 involves a partially reflecting and transmitting film inclined to the incident beam and arranged in parallel relation with a completely reflecting film, with incident and transmitted beams being on opposite sides of the combined films, and with the two films being spatially related such that the incident beam clears the reflecting film and is only incident on the partially reflecting and transmitting film, whereas the reflected beam from the totally reflecting film clears the partially reflecting and transmitting film. The simplest form is a simple glass or other transparent medium having major surfaces ground and polished flat and parallel with one another, and the films then provided on opposite surfaces in the manner indicated. FIG. 2 shows another modification employing two separate plates wherein the films are provided along one entire major surface of each of the plates and then the two cemented together to form the construction illustrated therein. Thus, one plate designated by reference numeral 35 has on its remote surface the partially-transmitting and reflecting film 25', and the other plate designated by 36 has on its surface the completely reflecting film 26'. The two plates are cemented together along their contacting surfaces as shown in FIG. 2, or otherwise held in the relationship illustrated. It is noted that the FIG. 2 view is a side view of the plates, and that the plates are generally of rectangular configuration with a depth into the plane of the drawing sufficient to intercept the whole of the beam. Also, the layers have been exaggerated for the sake of clearness, and this applies to the other figures also. The provision of suitable partially reflecting and transmitting films, which may be metallic or dielectric, or totally reflecting films, which are usually metallic, is well known in the art and need not be further described. FIG. 2 also illustrates more clearly the beam paths involved. The incident beam 16 makes an angle $\theta_i$ with the receiving surface of the plate 35. The beam undergoes refraction and then impinges on the interface of its remote surface with the partially-reflecting film 25'. The intensity of the transmitted portion of the beam, which is indicated by reference $I_t$, depends on the properties of the film 25' and the beam's angle of incidence and can be adjusted to any level desired. The portion of the beam that reflects is designated by $I_r$. It crosses into the second plate 36 (reflections at this interface are ignored), and then simply reflects off the film 26' to form a beam designated $I_{r2}$. This beam $I_{r2}$, ignoring for the moment the film 37, will again be refracted and emerge from the plate 36 as a transmitted beam $I_{r2t}$. It turns out that the separation $S_1$ between the two transmitted beams $I_t$ and $I_{r2t}$ is determined by the thickness $d$ of the plates 35 and 36, and is only slightly dependent upon the orientation $\theta_i$ and index of refraction of the plates. As a consequence, the index of refraction of the plates and $\theta_i$ can be modified as required by other demands of the system. It will also be evident that the relative intensity of the two beams $I_t$ and $I_{r2t}$ is dependent upon the transmitting characteristic of the film 25', which in turn is dependent upon the angle of incidence of beam 16 on it. Thus, increasing the angle of incidence $\theta_i$ will in general cause the first transmitted component $I_t$ to increase and the second transmitted component $I_{r2t}$ to decrease. The effects are different for each of the polarization components of the beam, but it will become evident to one skilled in the art that the large number of parameters present, such as wavelength, refractive index, angle of incidence, and characteristics of the two films, in addition to the polarization, can be suitably modified to achieve the results desired.

Figure 3:
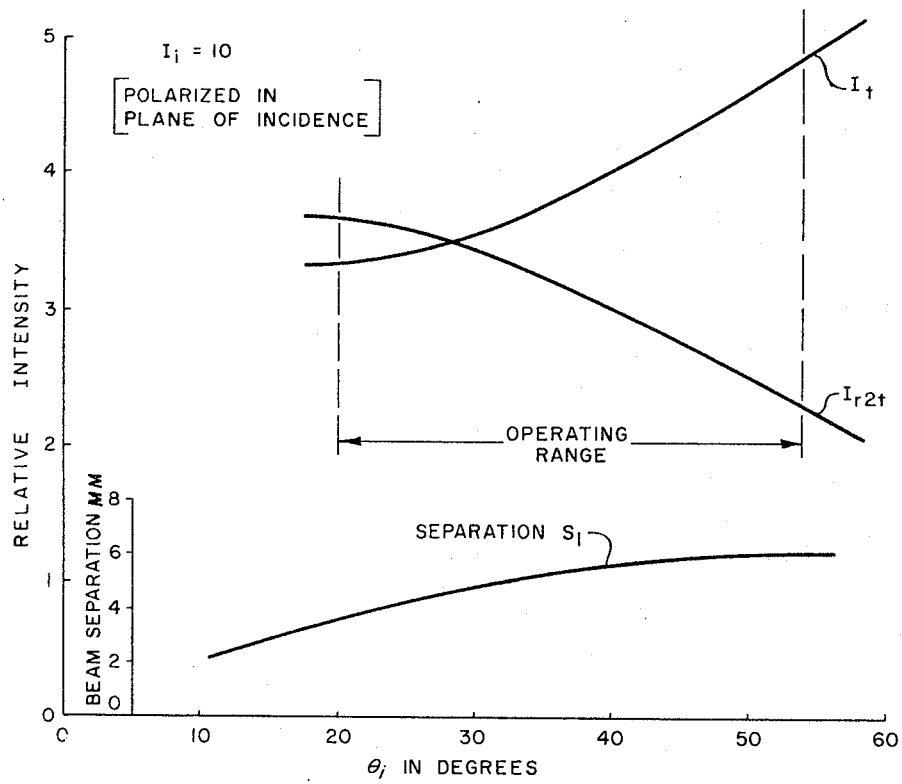
FIG. 3 is a graph showing operation of the beam dividers of FIGS. 1 and 2.

In reducing this invention to practice, I have employed a configuration similar to FIG. 2 using a flat, clear, optically-polished, glass slab several millimeters thick and about an inch long and ½ inch wide. The reflecting film 26' was an aluminum film of high internal reflectivity (approximately 75%). The film 25' was a low loss, multiple-layer, dielectric film. The incident beam (polarized in the plane of incidence) had a two millimeter cross-section and was derived from a CW helium-neon gas laser. The emerging beams were indeed parallel and in the same plane as the incident beam. FIG. 3 indicates the relative intensity of the two transmitted components $I_t$ and $I_{r2t}$ and their separation $S_1$ as a function of $\theta_i$. By operating the device in the range of approximately 20°–50°, it will thus be seen that the separation is not greatly affected, while obtaining large changes in the relative intensities, the necessity for which will be hereinafter explained.

Returning now to FIG. 2, it will further be evident that by providing a second partially reflecting and transmitting film 37 on the remote surface of the plate 36, then only a fraction of the beam power will be transmitted in the transmitted beam $I_{r2t}$, and the remainder of that beam upon reflection from the film 26' forms a beam $I_{r4}$ which can emerge from the plate 36 as a third transmitted component $I_{r4t}$, separated by a spacing $S_2$ determined by the thickness of the plate 36. This last transmitted beam will also be parallel to the other two and in the same plane.

Returning now to FIG. 1, the prism 10 is in the form of a trapezoid with a depth into the plane of the drawing sufficient to accommodate the incident beams 28 and 30 and has provided on its upper major surface 11 two separated, highly reflecting, film portions 40 and 41. The configuration is chosen so that the incident beams 28 and 30 will impinge substantially normally on the entrance surface 42 of the prism, with the lower beam 28 directed to impinge generally centrally of the upper surface 11 of the prism, and after one reflection to emerge from the prism at an exiting face 43 also generally normally arranged relative to the beam 28. The upper beam 30 is directed to impinge on the nearer reflecting film 40 and after reflection therefrom to impinge generally centrally on the lower surface 13 of the prism 10 and upon subsequent reflection from the further reflector 41 to emerge also from the prism 10 still parallel and coplanar with the beam 28. The lower beam 28 is the sample beam which will interrogate the sample 12 while the upper beam 30 is the reference beam which will interrogate the reference substance 14. The two beams are oriented in a common plane, the plane of incidence, and preferably are polarized parallel to that plane. As will be observed, both the sample and the reference beams pass through a single common prism 10, whose optical geometry is arranged so that the beams impinge on different, in this preferred case, opposite, major surfaces of that common prism, which surfaces are maintained in contact with the unknown sample and the reference substance. In the form shown, the sample material 12 being analyzed is maintained in contact with the surface 11 of the prism by mounting a container 45 in sealing arrangement with the prism 10 and simply filling the container 45 with the unknown substance, generally in the form of a liquid. For illustrative purposes, the mounting arm 31 has been pivoted at this container 45 at 33. The reference substance is provided by a second container 46 containing a spout 47 through which a supply of the reference liquid can be provided in contact with the surface 13 of the prism, a plug 48 being provided for removing the reference liquid when desired. There is no particular reason for putting the sample in contact with the surface 11 and the reference in contact with the surface 13 and these may be reversed. Thus, the surface 13 can be directly immersed into a liquid to be analyzed while providing the reference in contact with the top surface 11. For in-line analysis, the prism can be mounted in sealing arrangement in a wall of the pipe or other duct carrying the liquid to be analyzed so that the flowing liquid contacts one of the major surfaces 11 or 13 of the prism 10, and then the reference substance provided in contact with the other major surface located outside of the pipe. This is one of the important advantages of the optical system described, namely, by using a single prism opposite surfaces of which are contacted with, respectively, the unknown sample and the reference, an arrangement results which lends itself very readily to in-line direct analysis of an unknown material or direct immersion analysis. It will also be appreciated that my novel optical system is not limited to the analysis of liquids and is also useful for analysis of solids and particularly gases, the latter being possible due to the achievement of extremely high sensitivity.

The two parallel beams emerging from the prism 10 impinge upon separate detectors 50 and 51. In the form shown, to enhance the compactness of the system, I prefer to use a pair of photocells, which may be photoconductive devices or photodiodes, of comparable detecting area and sensitivity and of wide aperture so that changes in the direction of the beams will still enable them to be fully received and detected. They are connected as shown in a standard differential circuit to a potentiometer 52 whose center tap 53 is connected between the photocells. This permits the signals to be suitably adjusted in a standard known null-balanced system. The differential output is amplified in a conventional linear amplifier 54, whose output is coupled to a suitable meter or other recorder 55 to indicate the absolute value of the electrical signal difference.

As previously mentioned, to obtain enhanced sensitivity, the angle of incidence of the beams 28 and 30 onto the surfaces 11 and 13 are adjusted to a value just below the critical angle $\theta_c$ of the prism-sample interface—preferably between the so-called principal angle $\theta_c$ and the critical angle $\theta_c$, where $$\theta_c = \sin^{-1}\left(\frac{n_{sample}}{n_{prism}}\right)$$

and $$\theta_p = \tan^{-1}\left(\frac{n_{sample}}{n_{prism}}\right)$$

As is well known, the curves which relate the reflectivity of the interface as a function of the incident angle assume some value considerably below 100% at angles below the critical angle and then sharply rise at the critical angle to the 100% level and continue at that level out to grazing incidence. The curves are different for the two polarization components, though in either case the change of reflectivity is extremely sharp at angles within 1° or 2° of the critical angle. I prefer to use the beam component whose electric vector is parallel to the plane of incidence, as the change of reflectivity with angle is more pronounced than for the other polarization component.

To operate the system, it should first be balanced. For this purpose, one simply provides the same material on both surfaces 11 and 13 and then adjusts the arm 32 about the pivot point 33 until the critical angle is reached, manifested by the maximum signal generation by each of the cells 50 and 51. Then the signals are nulled or balanced by rotating the beam divider 20 about its pivot 32 until the desired intensity levels of the incident beams 28 and 30 are achieved at which, with the sensitivity of the detectors 50 and 51, the signal is nulled out. Desirably, the intensities of the beams 28 and 30 are equalized, and then the movable arm 53 of the potentiometer varied to equalize the sensitivity of the cells. Next, the arm 31 is rotated to a point where the beams 28 and 30 impinge at an angle just below the critical angle, where, for example, the generated signal from each cell has an intensity between ½ and ⅔ of the maximum signal. If now the index of the substance 12 in any way varies, by change in its temperature, pressure, or composition, the light reflected from the prism-sample interface will be of different intensity from that reflected from the prism-reference interface, and will result in a nonzero output in the system which is then a direct measure of the index change. I have reduced to practice a similar system using a glass prism ($n=1.5$) having dimensions of approximately 1 x ½ cm. and 1 cm. into the plane of the drawing. Vacuum-deposited aluminum was used to form the reflector surfaces 40 and 41. The irradiation was that obtained from the previously mentioned helium-neon gas laser. The detectors were matched silicon photovoltaic cells approximately ½ cm. x ½ cm. in size positioned to intercept the two reflected beams. The outputs from the two cells was connected in opposition across the balancing potentiometer 52 and then amplified and recorded in an X–Y recorder.

In the prism illustrated in FIG. 1, it will be noted that one beam undergoes two reflections in addition to that from the desired interface, in contrast to the other beam which undergoes no additional reflections. FIG. 4 illustrates a modified prism in which the reflections are the same for both beams. In this case, the prism, designated by 60, has a reflecting film 61 on its top surface and another reflecting film 62 on its bottom surface. As will be evident, each beam therefore undergoes one reflection from a metallic reflector in addition to a reflection from the interface being investigated. The beams in this case exit in the same direction as the incident beam but displaced therefrom. FIG. 5 shows another prism modification. In this case, the prism is a rectangular block 65 with an entrance triangular section 66 at one side and an exiting triangular section 67 at the opposite side. Reflecting coatings are designated by the reference numerals 68 and 69 on the left surface and 70 and 71 on the right surface. The sample may be provided at the lower surface 72, which may be obtained by simply immersing the block 65 into the liquid sample being analyzed, and the reference liquid is supplied at its top surface 73. Various other changes in the geometry of these prisms may be made where different orientations of the exiting beam relative to the incident beam are desired.

One of the advantages of the described system is the simpler temperature compensation afforded. Since the sample being analyzed is in direct contact with the same prism which also contacts the reference liquid, changes in the temperature of the sample substance will be transmitted through the prism to the reference substance which will thus assume the temperature of the unknown sample. Thus, where the system is intended only to detect changes in the composition of the unknown, the effects of temperature changes which would also cause a change in the index of reflection will tend to be minimized.

The system described can also be employed to detect changes in the angle of incidence of an incident beam, an application of which is a so-called star tracker. In this case, the star light constitutes the source of input radiation corresponding to the original undivided beam 16. The surface 13 may be exposed to air so that the interface is a prism-air interface, while the opposite surface 11 of the prism is metallized 57 to form a simple reflector, as shown in FIG. 6. In this case, the reflectivity of the metallized surface 57 becomes substantially independent of the angle of incidence of the beam 28 and thus serves as the reference, whereas the reflectivity of the prism-air interface 13 is a strong function of the angle of incidence where the initial angle is chosen at just below the critical angle. Thus, the photocell 51 sees the prism-metal interface of unchanged reflectivity, whereas the photocell 52 sees the prism-air interface whose reflectivity is rapidly varying as the star moves thus varying the angle of incidence, and a difference signal output will be obtained which will sensitively indicate the changed angle. By an appropriate servo-mechanism, either the prism 10 can be rotated to balance out the system, or the beam divider 20 rotated to balance out the system, the amount of rotation in both cases being an indication of the changed angle of incidence of the light from the remote star. In this way, the system can be designed to track the star or other remote light source as it moves through space.

Those skilled in this art will recognize the importance of the beams being adequately collimated, polarized and monochromatic. The sensitivity will depend upon the care with which one meets the above requirements. Fortunately, the output beam of a laser will inherently fulfill these requirements and constitutes an excellent radiation source for purposes of this invention. Though the angle-sensing device was described as a star tracker, it will be appreciated that it is useful for detecting or sensing changes in position of any light source, and thus can be used, for instance, for vibration or deflection testing and for precision alignment by placing a light source onto a support.

For high sensitivity, though the range of variation of the sample index will be limited, it is desirable that the ratio of prism-sample indices be close to unity, and one should therefore choose an appropriate prism material for the sample being analyzed to satisfy this condition. One may use any number of transparent materials for the prism, such as AgCl ($n=1.9$) for the wavelength range 0.4–30$\mu$, TlBrI (KRS-5) ($n=2.4$) for the range of 0.6–40$\mu$, Ge ($n=4.0$) for the range of 2–20$\mu$, in addition to the many varieties of glasses and synthetic resins available for this purpose. Similarly, the refractive index of the reference should be close to that of the unknown sample, and a choice may be made from any number of known materials, liquid or otherwise, having the required index.

The sensitivity can be even further enhanced by the use of multiple internal reflections of both beams from their associated interface, easily obtained by a reshaping of the prism or the judicious use of mirror segments to prevent the sample beam from impinging on the reference material, and vice versa. FIG. 7 shows one illustrative embodiment, the prism being designated 75, and the mirror-reflecting films 76, which are located to confine the sample beam to the sample, and the reference beam to the reference. However, greater care has to be exercised in the construction of the prism to ensure that the surfaces are sufficiently flat and parallel to maintain a collimated beam and thus insure that the incident angle remains constant as the beam propagates through the prism.

To improve the efficiency of collection of the beams, it is desirable to position the detectors as close as possible to the exiting aperture 43 of the prism. In fact, I prefer to attach the detectors directly to the exiting surface 43 using a transparent cement of the appropriate index to reduce reflection looses. As a further alternative, the photocell can be a photoconductive material deposited directly on the end face 43, with contacts subsequently provided by standard techniques. The usual insulating nature of the prism permits this arrangement. FIG. 8 shows such an arrangement. The prism is designated 10, and the two photoconductive layers 85 and 86. Contacts are referred to by numerals 87. An antireflecting coating 88, which may be insulating if necessary, is provided between the cells 85 and 86 and the prism 10. Where the prism 10 is a semiconductive material, such as germanium or silicon, or one of the III–V compounds, then the detector can be directly integrated with the prism using standard techniques now fully developed in the integrated circuit art. FIG. 9 illustrates such an arrangement whereby diffusion of appropriate impurities or the growing of additional semiconducting layers on the prism, the photodetectors 90 are integrated with the prism 10, which will eliminate surface reflection losses. Of course, these cells will have to be shielded for external radiation.

While I have described my invention in connection with specific embodiments and applications, other modifications thereof will be readily apparent to those skilled in this art without departing from the spirit and scope of the invention as defined in the appended claims.

What is claimed is:

1. A differential optical system comprising a common prism having opposed planar and parallel surfaces forming two interfaces with external environments; a source of radiation producing a first beam of radiation; a beam divider receiving said first beam and forming second and third parallel beams, said divider comprising an optically transparent body having opposed planar parallel surfaces, means rendering at least a portion of one of said major surfaces partially reflecting and transmitting and means rendering at least a portion of the other major surface substantially totally reflecting, means for positioning said divider to receive said first beam of radiation into said body unimpeded by the total reflecting means in such manner that the beam impinges on the interface of the body and the said partially reflecting and transmitting means, whereby a second beam is transmitted through the body and another beam is formed which reflects back into the body, the total reflection means being arranged to further reflect the other beam to an area of the body free of the partially reflecting and transmitting means whereby a third transmitted beam is formed which is substantially parallel to and in the same plane as the second transmitted beam; means for directing the second beam of radiation through the prism so as to impinge substantially only on one of said interfaces; means for directing the third beam through the prism so as to impinge substantially only on the other interface; means for separately detecting each of the beams after they have impinged on their respective interfaces; differential circuit means for measuring the difference signal developed by the said detecting means; said directing means being arranged to direct at least one of the beams at its interface at an angle of incidence just below the critical angle for the prism-environment interface; and means for rotating the divider relative to the first beam for varying the relative intensities of the second and third beams.

2. A differential optical device comprising a prism having at least two surfaces forming two interfaces with an external environment, means for directing a first beam of radiation through the prism so as to impinge substantially only on one of said interfaces, means for directing a second beam through the prism so as to impinge substantially only on the other interface, means for detecting each of the beams after they have impinged on their respective interfaces, and means for measuring the difference signal developed by the said detecting means.

3. A differential optical device comprising a common prism having opposed planar and parallel surfaces each forming an interface with a different external environment, means for directing a first beam of radiation through the prism so as to impinge substantially only on one of said interfaces and be reflected therefrom, means for directing a second beam through the prism so as to impinge substantially only on the other interface and be reflected therefrom, means for separately detecting each of the reflected beams after they have impinged on their respective interfaces and generating two electrical signals each of which is a function of the reflectivity of the respective interface, and differential circuit means coupled to the detecting means for measuring the difference between the two signals, said prism being positioned relative to at least one of the beams such that the angle of incidence of that beam on the interface is just below the critical angle for the prism-environment interface.

4. A differential optical device as set forth in claim 3 wherein the angle of incidence of said one beam lies between the critical angle $\theta_c$ and the principal angle $\theta_p$, where $$\theta_c = \sin^{-1}\left(\frac{n_E}{n_P}\right)$$

and $$\theta_p = \tan^{-1}\left(\frac{n_E}{n_P}\right)$$

and $n_E$ is the refractive index of the external environment and $n_P$ is the refractive index of the prism material.

5. A differential optical device as set forth in claim 3 wherein the two beams are substantially parallel to one another, and reflecting means are provided at selected areas of the parallel surfaces to confine each of the beams to reflecting from only one of the interfaces formed with an external environment.

6. A differential optical device as set forth in claim 3 wherein the two beams are collimated, substantially monochromatic, and at least said one beam is polarized parallel to the plane of incidence.

7. A differential optical device as set forth in claim 3 for use as a refractometer, wherein means are provided to supply a sample material in contact with one of the parallel surfaces and a reference substance in contact with the other of the parallel surfaces, the difference between the two signals varying with a change in the refractive index of the sample material.

8. A differential optical device as set forth in claim 3 for use as a light beam direction detector wherein the first and second beams are derived from an external source whose direction is to be detected, one environment is chosen such that the reflectivity of the associated interface is a relatively strong function of the angle of incidence of its beam thereon, and the other environment is chosen such that the associated interface is a relatively weak function of the angle of incidence of its beam thereon, the difference between the two signals varying with a change in position of the external source producing a change in the angle of incidence of the beams.

9. A differential optical device as set forth in claim 3 wherein the detecting means are integrated with an end portion of the prism.

10. A beam divider comprising an optically transparent body having opposed planar parallel surfaces, means for rendering at least a portion of one of said surfaces partially reflecting and transmitting, means for rendering at least a portion of the opposed surface substantially totally reflecting, and means for positioning said body to receive an incident beam of radiation on the opposed parallel surface free of the partially reflecting and transmitting means and into said body unimpeded by the substantially totally reflecting means in such manner that the beam impinges on the interface of the body and the said partially reflecting and transmitting means, whereby a first beam is transmitted through the body and a second beam is formed which reflects back into the body, the substantially totally reflecting means being arranged to further reflect at least a portion of the reflected beam to an area of the body free of the partially reflecting and transmitting means whereby a second transmitted beam is formed which is substantially parallel to and in the same plane as the first transmitted beam, said transmitted beams emerging from the body at the said one parallel surface.

11. A beam divider comprising an optically transparent body having opposed planar parallel surfaces, means for rendering at least a portion of one of said surfaces partially reflecting and transmitting, means for rendering at least a portion of the opposed surface substantially totally reflecting, and means for positioning said body to receive an incident beam of radiation into said body unimpeded by the substantially totally reflecting means in such manner that the beam impinges on the interface of the body and the said partially reflecting and transmitting means, whereby a first beam is transmitted through the body and a second beam is formed which reflects back into the body, the substantially totally reflecting means being arranged to further reflect at least a portion of the reflected beam to an area of the body free of the partially reflecting and transmitting means whereby a second transmitted beam is formed which is substantially parallel to and in the same plane as the first transmitted beam, the partially reflecting and transmitting means exhibiting reflectivity dependent on the angle of incidence of the radiation beam thereon, and means for rotating the body relative to the incident beam for varying the relative intensities of the two transmitted beams without any substantial change in their direction.

12. A beam divider as set forth in claim 11 wherein the partially reflecting and transmitting means comprises a film on one of the parallel surfaces, and the substantially totally reflecting means comprises a film on the opposed parallel surface.

References Cited

UNITED STATES PATENTS

| | | | |
|---|---|---|---|
| 2,281,607 | 5/1942 | Thomas | 350—173 |
| 2,476,014 | 7/1949 | Wright | 350—171 |
| 2,686,454 | 8/1954 | Ruska. | |
| 2,810,315 | 10/1957 | Miller. | |

OTHER REFERENCES

"Studies in Refractive Index III," A. Taylor et al., J. of the Optical Society of America, vol. 23, No. 8, August 1933, pp. 263–9.

RONALD L. WIBERT, *Primary Examiner.*

R. J. WEBSTER, *Assistant Examiner.*

U.S. Cl. X.R.

203—3; 356—134, 135, 144, 169, 171, 286